United States Patent [19]

Wallenberger

[11] 4,051,210

[45] Sept. 27, 1977

[54] PROCESS FOR COMOLDING A COMPOSITE CUSHIONING STRUCTURE FROM A PNEUMACEL FIBER BATT AND SYNTHETIC ELASTOMERIC FOAM

[75] Inventor: Frederick Theodore Wallenberger, Wilmington, Del.

[73] Assignee: E. I. Du Pont de Nemours and Company, Wilmington, Del.

[21] Appl. No.: 581,093

[22] Filed: May 27, 1975

[51] Int. Cl.² .............................................. B29D 27/04
[52] U.S. Cl. .................................. 264/45.4; 264/45.8; 264/46.4; 264/257; 297/5; 297/361; 297/DIG. 1; 428/310; 428/315; 428/376; 428/398
[58] Field of Search ................... 264/45.3, 46.3, 45.1, 264/46.4, 257, 45.4, 45.8; 156/209, 181; 297/361 B, DIG. 1, 5; 260/2.5 R; 428/315, 310, 376, 398

[56] References Cited

U.S. PATENT DOCUMENTS

| | | |
|---|---|---|
| 2,140,063 | 12/1938 | Talalay .............................. 264/45.3 |
| 2,194,036 | 3/1940 | Talalay .............................. 264/45.3 |
| 2,290,614 | 7/1942 | Rathbun ............................. 264/45.3 |
| 2,972,554 | 2/1961 | Muskat et al. .................. 264/45.3 X |
| 3,340,335 | 9/1967 | Winchcombe .................. 264/46.3 X |
| 3,375,212 | 3/1968 | Bonner ............................. 260/2.5 R |
| 3,471,610 | 10/1969 | Sadek ............................... 264/53 X |
| 3,483,069 | 12/1969 | Cairns et al. ................... 264/45.3 X |
| 3,485,711 | 12/1969 | Fish et al. ....................... 156/209 X |
| 3,535,181 | 10/1970 | Yunan ................................. 156/81 |
| 3,617,594 | 11/1971 | Willy ................................. 264/45.3 |

*Primary Examiner*—Philip Anderson

[57] ABSTRACT

A process for the combination of pneumacel fiber and synthetic elastomeric foam is provided that yields highly desirable, composite cushioning structures. A compressed, resin-bonded pneumacel batt is pre-expanded and combined with a precursor of an elastomeric foam under conditions leading to minor but definite penetration of the batt by the foam to give durably unitary cushioning with the best features of both materials.

9 Claims, 1 Drawing Figure

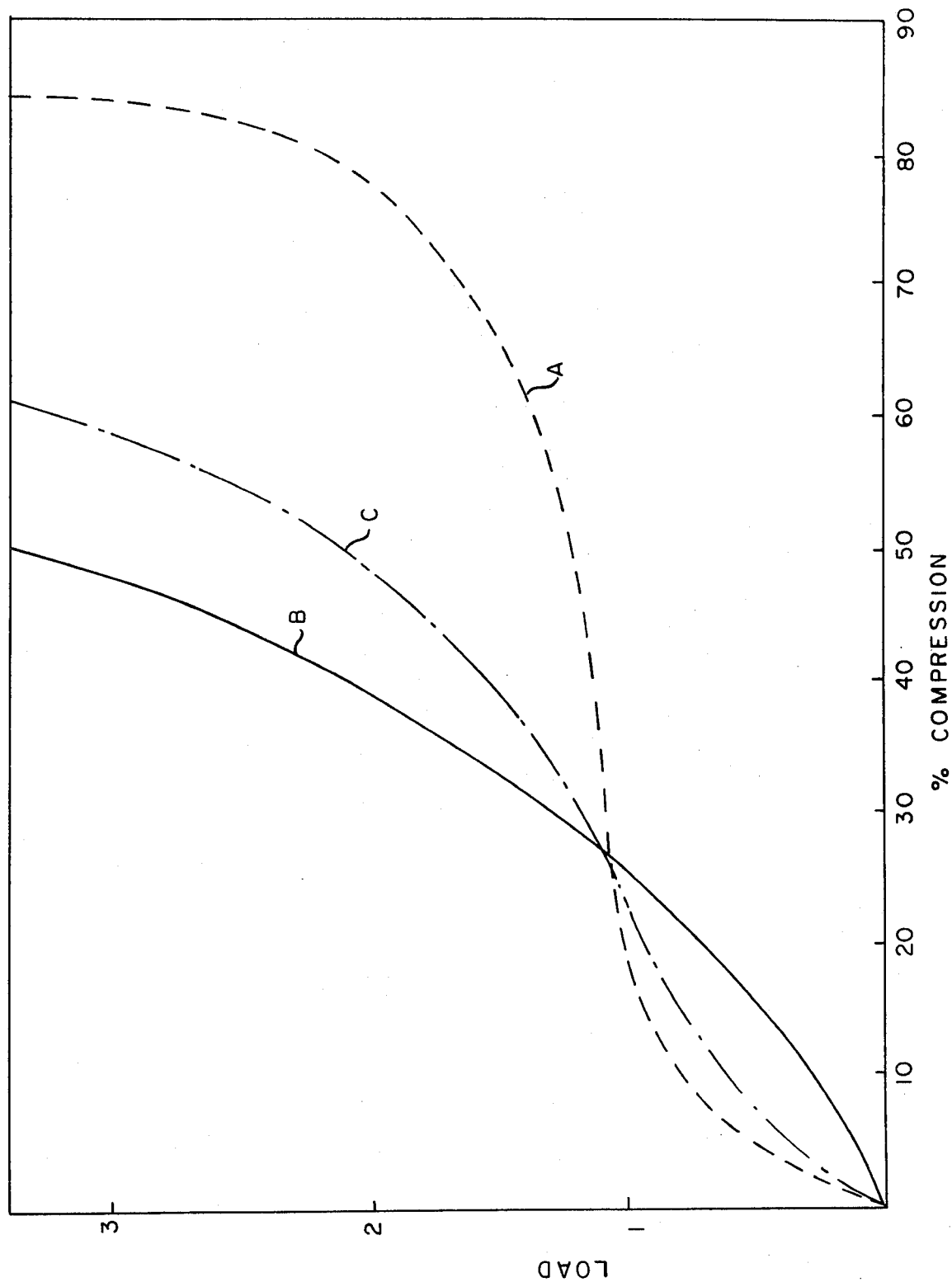

PROCESS FOR COMOLDING A COMPOSITE CUSHIONING STRUCTURE FROM A PNEUMACEL FIBER BATT AND SYNTHETIC ELASTOMERIC FOAM

BACKGROUND OF THE INVENTION

This invention is concerned with the comolding of resin-bonded nonoven batts with an uncured foam or a foamable composition and more particularly with the comolding of batts comprising inflated pneumacel fiber with foamed latex or polyurethane foam.

It is known from U.S. Pat. Nos. 3,375,211; 3,375,212 and 3,503,907 among others, to manufacture pneumacel fibers by extrusion of a solution of a polymer at a temperature above the boiling point of the major solvent component to produce a filament in which substantially all of its polymer content is in the thin walls of extremely small foam cells, to incorporate into the cells a gas which does not readily permeate the cell walls, and to allow air to diffuse osmatically into the cells to inflate them to a pressure substantially above atmospheric. Such fibers, which have densities of 0.01 g./cc. or less, may be formed into compressed, resin-bonded, nonwoven batts by processes, as taught in U.S. Pat. Nos. 3,485,711; 3,521,328 and 3,535,181 which involve deposition of the fibers as a loose, uniform batt on a continuous belt, impregnation with a thermoplastic binder in the form of a latex, drying, heating to melt the binder, compressing and cooling before release from compression to "set" the batt in its compressed form. It is also taught in U.S. Pat. No. 3,535,181 that the compressed batt can be expanded by heating to melt the binder and cooling to rebond the batt in a more open form. If done in a confined space no more than about 2-3× the height of the batt thickness, the resulting batt surfaces follow the contours of the confinement. Such expanded batts are softer than the compressed batts; the gradually increasing firmness with increasing load makes them more comfortable, and hence superior for seating and certain other uses.

It is also known to manufacture cushioning foams from a variety of elastomeric materials including rubbers, both natural and synthetic, and the polyurethanes. Such foams are characterized by good resistance to cushioning of small-to-moderate loads and "bottoming" under somewhat larger loads. By bottoming is meant an abrupt end of the ability to compress further with increasing load; this characteristic significantly limits utility and must be compensated in some uses by combination with other materials.

U.S. Pat. No. 3,535,181 discloses that a foamable composition or an incompletely cured froth of an elastomeric polymer can be doctored onto either one or both faces of a compressed batt of pneumacel fibers and further it is recognized that expansion of the consolidated pneumacel batt occurs under the influence of the sensible heat applied to dry a latex foam or that developed in the chemical reaction leading to a polyurethane foam. Self-bonding of that composite is partly due to penetration of the expanded pneumacel by the foam; this contribution is small, however, since the viscosity of the foam precursor greatly increases, restricting its ability to penetrate before the pneumacel batt has opened significantly. The above-noted expansion without rigid confinement of the pneumacel batt leads to uneven pneumacel and foam surfaces; the foam must be skived to flatten, creating waste material. This unevenness is an obstacle to the economical production of a composite cushion with adequate uniformity and durability.

SUMMARY OF THE INVENTION

A process of comolding a compressed resin-bonded nonwoven batt of pneumacel fiber with an elastomeric foam comprising: expanding the batt to about twice its compressed thickness while confined by heating to a temperature of from about 90° to about 165° C.; cooling the batt to below 30° C. to set it in the expanded form; and combining the expanded batt with a precursor of an elastomeric foam (e.g., rubbers, both natural and synthetic, and polyurethanes) in a manner calculated to give the desired arrangement of foam and pneumacel. One method of combining the two is by placing the expanded batt into a mold having a cavity depth greater than the expanded batt thickness; pouring an uncured foam into the mold over the expanded pneumacel batt; allowing the contents of the mold to set at room temperature for a predetermined period of time; removing the contents from the mold; and curing said contents at an elevated temperature for a predetermined period of time.

BRIEF DESCRIPTION OF THE DRAWING

The drawing illustrates compression versus loading curves for different materials and a combination thereof. The ordinate represents the degree of loading and the abscissa the percent compression.

DETAILED DESCRIPTION OF THE PREFERRED EMBODIMENT

A nearly ideal combination is provided under this invention in a layered composite comprising a foam as the load-contacting component and a supporting expanded pneumacel batt. Optionally, the composite may further be supported on a spring foundation.

In the drawing, curve A illustrates the compression-test results with a typical polyurethane foam. From zero load to near the point of intersection with the other two curves, it confirms the results of subjective tests; that is, foam provides good support for applied seating load and therefore is more comfortable. A substantial increase in load, as generated by shifting to lower area of contact for the same load or, especially in the case of transportation seating, an acceleration in loading caused by a "bump" in the road leads to "bottoming" of the foam or complete loss of cushioning as the resilience of the foam is used up. Bottoming is also characteristic of other soft foams, including those of synthetic rubber.

Curve B illustrates compression-test results from an expanded pneumacel batt. The deficiency in support at low loads is clearly seen, but there is no tendency for the batt to compress sharply and bottom at higher loads.

Curve C illustrates the compression data from a layered polyurethane foam/expanded pneumacel composite in which each is about the same thickness, the foam layer being on top. It is clear that the advantages of both cushions are retained and that the disadvantages of both are circumvented. The convenience of an integral composite in seating manufacture, relative to use of two separate materials, is obvious. To maintain the advantages of both materials, however, it is important that penetration of the pneumacel batt by the elastomeric-foam precursor be kept to little or no more than the minimum required for satisfactory cohesion of the layers. Such a structure may be prepared as outlined in the following examples.

EXAMPLE I

Pneumacel fiber prepared substantially as described in Example I of U.S. Pat. No. 3,743,694 is formed into a batt as taught by U.S. Pat. No. 3,535,181. In summary, a solution of high molecular weight poly(ethylene terephthalate) in methylene chloride under pressure, and at a temperature above the boiling point of the solvent, is extruded to the atmosphere to form closed-cell foam filaments that immediately deflate as the solvent evaporates; the filaments are cut to about 3-inch length and reinflated in an aqueous suspension of methylene chloride (that serves to plasticize the filaments and permit entry of the inflatant) and chloropentafluorethane (some of which is trapped in the cells as the solvent is flashed off); the partially Freon®- inflated filaments are exposed to warm air until air inflated by osmosis to about 1⅓ atmospheres internal pressure and laid uniformly on a perforated, continuos belt; a latex containing a thermoplastic resin is sprayed onto the staple and dried in a circulating-air oven; the coated fibers are heated to melt the adhesive, compressed and cooled to form a batt of about 2 lbs./cu. ft. density.

The batt is heated in a confined space twice its thickness for about 2 minutes (from ⅓ to 5 minutes heating may be required for complete "puffing", depending on equipment characteristics) in a circulating-air oven at 140°–150° C., then removed and cooled. As the thermoplastic binder is softened, the batt expands to twice its original thickness, with little or no change in lateral dimensions, due to release of the compressional strains frozen in during manufacturing; cooling to room temperature rehardens the binder stabilizing the batt in its expanded form.

The batt is cut to the lateral dimensions of a mold having a cavity depth greater than the batt thickness. The expanded batt is placed in the mold and a foam precursor, of high enough viscosity to prevent excessive batt penetration, is poured on top of the batt. An isocyanate-modified neoprene foam as described below is admirably suited for this use; it combines superior load carrying ability and low density:

For each 100 parts of 60%-solids-content neoprene latex to be formulated, the following are mixed together:

0.6 parts of a 30-% solids wetting agent consisting of sodium salts of sulfate monoesters of higher fatty alcohols, chiefly lauryl and myristyl derivatives
1.5 parts of a 30% solution of octaphenoxy polyethoxy ethanol having an HLB value of 13.5
1.5 parts of a potassium salt of a processed resin sold as "Dresinate" 91 by Hercules
1.0 part of N,N'-diphenyl thiourea
0.235 parts of a 23.5% solution of sodium dimethyl dithiocarbamate
0.25 parts diethanolamine
7.5* parts zinc oxide
2* parts phenyl-β-naphthylamine antioxidant
4.4 parts antimony trioxide.
*added as a 66%-solids, ball-milled (24 hours) dispersion of
  79.0 parts zinc oxide
  21.0 parts phenyl-β-naphthalamine
  10 parts of a 10% solution of a purified sodium ligno sulfonate The above mixture is added with good stirring to the neoprene latex. With continuing stirring, the following are added in the order given:
20 parts dry aluminum trihydrate
X parts N-methyl diethanolamine.HCl (sufficient to reduce pH of the mixture to 11)
1.75-X parts N-methyl diethanolamine
After at least 2 hours ageing, add, just before frothing:
0.1 part of a 10% solution of ammonium caseinate Froth at high whip speed to desired height in bowl (about 7–12 seconds). Reduce whip speed and refine for about 6 minutes.

Add the following quickly to the foam:
14 parts poly methylene diphenyl isocyanate
4 parts of a 30% sodium silicofluoride dispersion
and stir at refining speed for 90 seconds.

Pour immediately into the mold over the expanded pneumacel batt and level the surface briefly.

Close the mold and condition at room temperature for about 45 minutes. Demold and cure/dry the foam at 121° C. to the desired compression set* (2–8 hours; compression set is about 10% for foams that have been cured 5 hours).
*"compression set" refers to the lack of immediate recovery from 50% compression for 22 hours at 70° C.

The foam can be made by art-known means from other materials such as a polyurethane-foam precursor thickened to control penetration of the expanded pneumacel batt. Variations to attain the desired load-support characteristics will occur to those skilled in the art.

The described procedure yields composite cushions of superior properties with expanded pneumacel on the bottom, a contact zone where the pneumacel batt is slightly penetrated by the foam to provide a mechanical bond, and a foam top with the detail and smooth surface imparted by the mold.

Composite structures according to Example I are formed by the following molding procedures:

EXAMPLE II

An expanded pneumacel batt laterally smaller than the mold is centered in the bottom of the mold, the cavity of which is filled with a foamed neoprene latex that is then cured to yield a cushion with all faces but one of foam and the one mostly of pneumacel.

EXAMPLE III

The cavity of the mold is partly filled with a foamed neoprene latex, and an expanded pneumacel pad similarly sized as in Example II is positioned on top of the foam. Additional foam is added to fill the mold. Curing leads to a composite cushion, all faces of which comprise foam.

EXAMPLE IV

An expanded pneumacel batt is secured to the underside of a mold cover. An elastomeric-foam precursor in quantity just more than enough to fill the residual mold space is poured into the mold. The mold cover is inverted and the foam cured. It is found that the foam has contiguously penetrated the outer few layers of the pneumacel batt to result in a good mechanical bond thereto.

EXAMPLE V

A continuous pneumacel batt of the desired width is expanded by passage between continuous belts through an oven wherein air at 130° C. is blown through it for 20 sec.; it is then cooled to <30° C., by blowing air at room temperature therethrough. The batt is fed onto a continuous belt having lateral confinement therefor. An elastomeric-foam precursor is doctored onto the pneumacel sheet and cured by means known in the art. The product is a two-layered composite cushion that can be cut to the desired shape and used as is. Alternatively, it can be turned pneumacel-batt side up and given a second layer of elastomeric foam.

EXAMPLE VI

The procedure of Example V is repeated with the addition of a light-weight nonwoven sheet on top of the pneumacel batt prior to doctoring on the elastomeric-foam precursor. This procedure prevents penetration of a highly fluid precursor into the batt beyond the first few layers of fiber, thus facilitating use of a broader range of precursors. It will be obvious that the nonwoven sheet has parallel utility in the individually molded cushions described in the foregoing procedures.

Cushions having pneumacel batt on a major part of one face are useful, among others, for fixed-cushion seating, such as automotive, theater or stadium seating or some office furniture. Cushions having elastomeric foams on both major faces are useful in reversible-cushion applications.

What is claimed is:

1. A process of comolding a resin-bonded nonwoven batt of pneumacel fiber with an elastomeric foam comprising heating while confined a compressed thermoplastic resin-bonded nonwoven batt of pneumacel fiber to soften the binder and expand the batt to about twice its thickness; cooling the resulting expanded batt to set it in the expanded form; placing the expanded batt in a mold or on a continuous belt having lateral confinement and adding a layer of a precursor of an elastomeric foam to at least one surface of said batt to form thereby a shaped composite, said precursor making a minor but definite penetration of said batt; and curing the shaped composite.

2. The process as defined in claim 1, said precursor of an elastomeric foam being a precursor of elastomeric or flexible polyurethane foam.

3. The process as defined in claim 1, said precursor of an elastomeric foam being a natural or synthetic rubber latex foam.

4. The process as defined in claim 2, said batt being expanded to about twice its compressed thickness by heating it at a temperature of from about 90° to about 165° C. and then cooling said batt to below about 30° C.

5. A process of comolding a compressed thermoplastic resin-bonded nonwoven batt of pneumacel fiber with an elastomeric foam comprising; heating said batt while confined to soften the binder and expand the batt to about twice its thickness; cooling said batt to set it in the expanded form; placing the expanded batt into a mold having a cavity depth greater than the expanded batt thickness; pouring a precursor of an elastomeric foam into the mold over the expanded pneumacel batt; allowing the contents of the mold to set at room temperature; removing the contents from the mold; and curing said contents at an elevated temperature.

6. The process as defined in claim 5, said batt being expanded to about twice its compressed thickness by heating it at a temperature of from about 90° to about 165° C. and then cooling it to below about 30° C.

7. The process as defined in claim 5, said precursor of an elastomeric foam being a precursor of a elastomeric or flexible polyurethane foam.

8. The process as defined in claim 5, said precursor of an elastomeric foam being a precursor of a latex foam.

9. The process as defined in claim 7, said curing step being conducted at an elevated temperature of about 121° C. for from about 2 hours to about 8 hours.

* * * * *